(12) United States Patent
Oates

(10) Patent No.: US 7,156,400 B2
(45) Date of Patent: Jan. 2, 2007

(54) SLINGER AND WEAR SLEEVE SEAL ASSEMBLY

(75) Inventor: Jack Darrin Oates, Fletcher, NC (US)

(73) Assignee: ArvinMeritor Technology, LLC, Troy, MI (US)

( * ) Notice: Subject to any disclaimer, the term of this patent is extended or adjusted under 35 U.S.C. 154(b) by 0 days.

(21) Appl. No.: 10/721,944

(22) Filed: Nov. 25, 2003

(65) Prior Publication Data

US 2005/0110221 A1 May 26, 2005

(51) Int. Cl.
*F16J 15/32* (2006.01)
(52) U.S. Cl. .............. 277/549; 277/572; 277/573; 277/571; 277/349; 384/486
(58) Field of Classification Search ............ 277/572, 277/573, 571, 549, 349, 402, 423, 565; 384/486
See application file for complete search history.

(56) References Cited

U.S. PATENT DOCUMENTS

| | | | | |
|---|---|---|---|---|
| 3,363,911 A | * | 1/1968 | McKinven, Jr. | ............ 277/349 |
| 5,605,337 A | * | 2/1997 | Puri | ............ 277/349 |
| 5,845,910 A | * | 12/1998 | Sabo | ............ 277/553 |
| 6,406,187 B1 | | 6/2002 | Lentini et al. | |

OTHER PUBLICATIONS

Prior art ArvinMeritor axle housing seals.

* cited by examiner

*Primary Examiner*—Alexander Grosz
(74) *Attorney, Agent, or Firm*—Carlson, Gaskey, & Olds

(57) ABSTRACT

A seal assembly provides a rotating portion and a rotationally fixed portion. The rotating portion includes a running sleeve, a slinger segment and an upper seal segment. The slinger segment radially extends outward of the fixed portion so as to protect the fixed portion. The fixed portion includes a press fit outer diameter which is pressed into an opening located within the assembly. A seal mount segment located receives a resilient annular seal which rides upon the running sleeve and the upper seal segment.

5 Claims, 4 Drawing Sheets

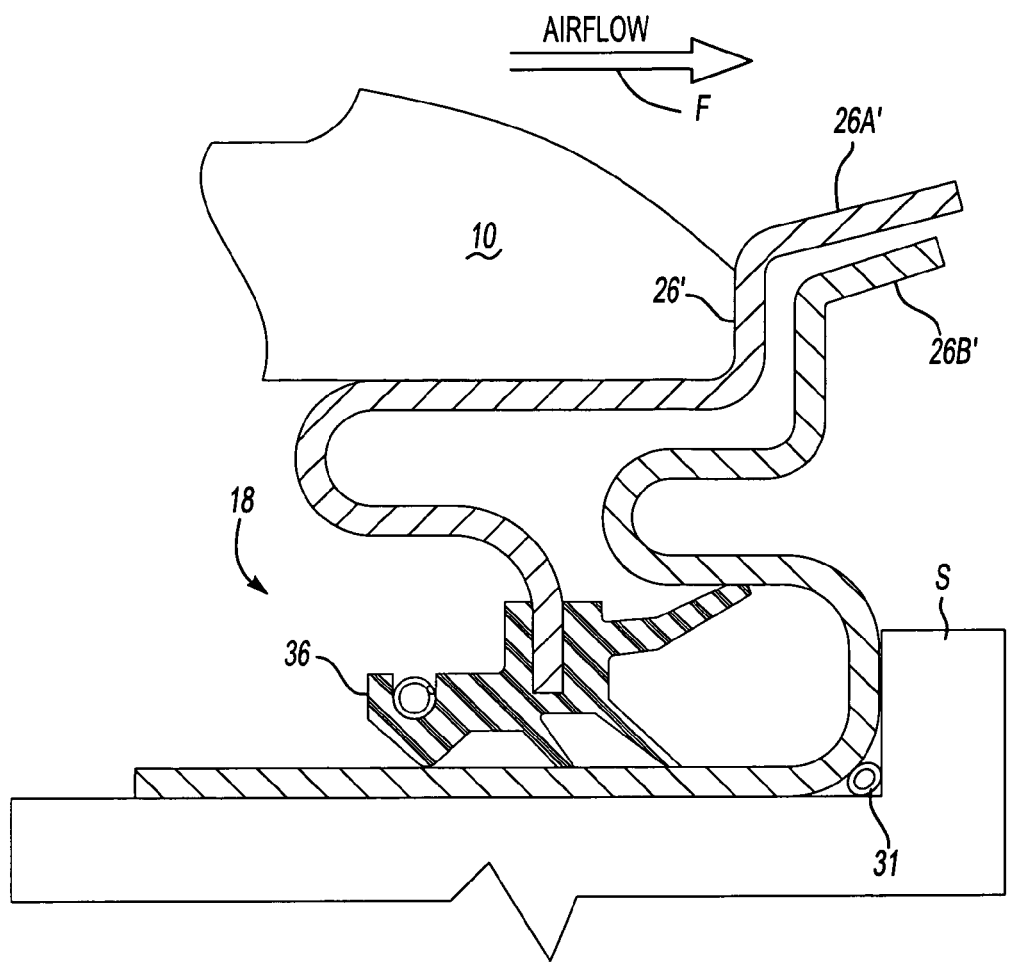

SLINGER AND WEAR SLEEVE SEAL ASSEMBLY

BACKGROUND OF THE INVENTION

The present invention relates to a seal assembly, and more particularly to an integrated slinger and wear sleeve seal assembly.

Current unitized seal designs are relatively complicated assemblies which seal rotational interfaces, such as where a yoke exits/enters an axle housing. Conventional seal designs are implemented to reduce the difficulty of assembly and to eliminate the requirement to change yokes after a seal failure. A unitized design includes rubber internal bump stops to preload excluder lips during yoke installation, and a running surface sleeve for a main seal lip interface. The bump stop and running sleeve interaction may create seal assembly and longevity issue tradeoffs.

Disadvantageously, the rubber bump stops increase thermal generation, through friction which is transferred to the seal element and may effect seal longevity. Reduction of the bump stops size, however, may fail to properly locate the excluder lips during yoke installation.

A resilient insulating material such as rubber is also utilized within the inner diameter of the running sleeve to maintain static friction between the yoke and running sleeve to prevent relative rotation. Minimization of the insertion force of the yoke through the running sleeve reduces assembly complications. Increasing the rubber within the running sleeve reduces insertion force and insulates heat within the seal. Removal of rubber increases insertion force but more readily transfers heat to the seal.

In addition, a slinger stamping is often separately mounted to the axle housing to further protect the seal assembly. Aside from the additional component, some seal locations do not have the benefit of a separate slinger stamping because of the housing geometry.

Accordingly, it is desirable to provide a robust and uncomplicated seal assembly which incorporates a slinger into the seal assembly via the running sleeve to isolate the seal and eliminate the bump stops to set excluder lip preload.

SUMMARY OF THE INVENTION

The seal assembly according to the present invention provides a rotating portion which rotates with a yoke and a rotationally fixed portion which is mounted to a housing assembly.

The rotating portion includes a running sleeve, a slinger segment and an upper seal segment. The running sleeve and the upper seal segment are located generally parallel to an axis of rotation. The slinger segment radially extends outward of the fixed portion so as to protect the fixed portion.

The fixed portion includes a press fit outer diameter which is pressed into an opening located within the housing assembly. A seal mount segment located transverse to the axis of rotation receives a resilient annular seal which rides upon the running sleeve and the upper seal segment.

The present invention therefore provides a robust and uncomplicated seal assembly which incorporates a slinger into the seal assembly via the running sleeve to isolate the seal and eliminate the bump stops to set excluder lip preload.

BRIEF DESCRIPTION OF THE DRAWINGS

The various features and advantages of this invention will become apparent to those skilled in the art from the following detailed description of the currently preferred embodiment. The drawings that accompany the detailed description can be briefly described as follows:

FIG. 5 is an expanded sectional view of the second seal assembly.

DETAILED DESCRIPTION OF THE PREFERRED EMBODIMENT

Figure 1:
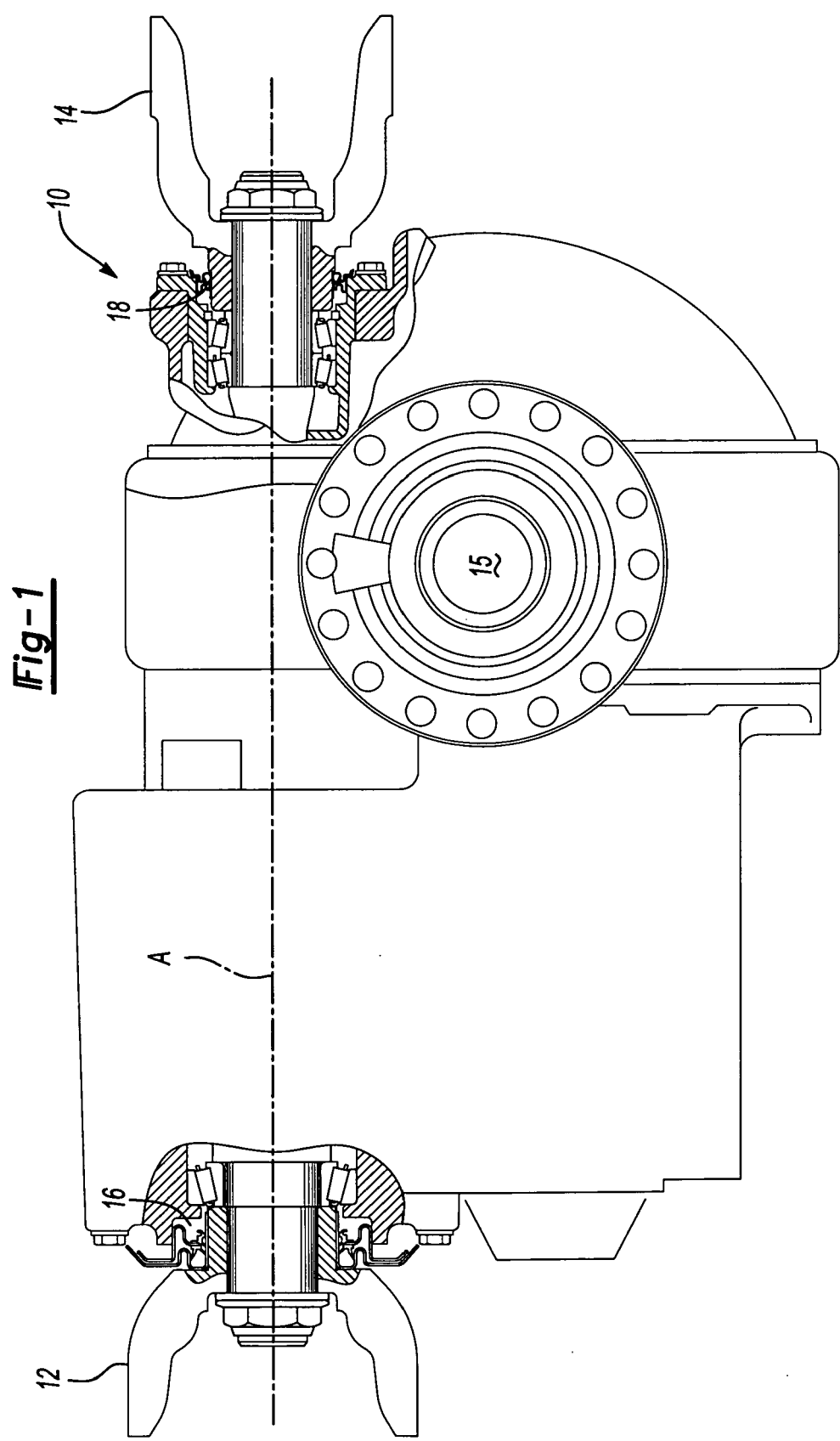
FIG. 1 is a general side view an axle housing for use with the present invention.

FIG. 1 illustrates a general side view of an axle housing assembly 10 having a forward drive yoke 12 and a rear-ward drive yoke 14 which extend there-from for rotation about an axis A. The assembly 10 drives a vehicle axle 15 such as that utilized by a heavy vehicle as generally known. It should be understood that although a particular component arrangement is disclosed in the illustrated embodiment, other arrangements can be utilized with the instant invention.

Figure 2:
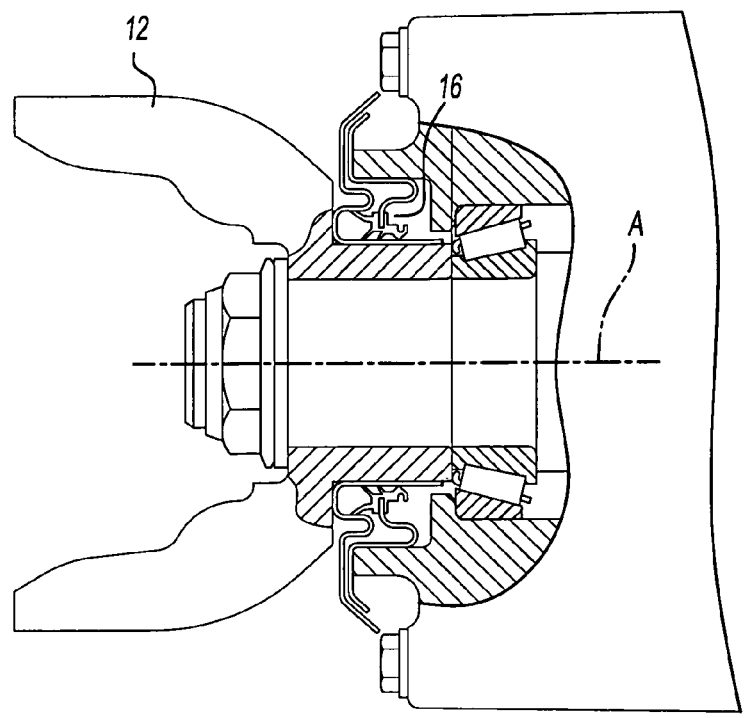
FIG. 2 is an expanded view of a first seal assembly.
Figure 3:
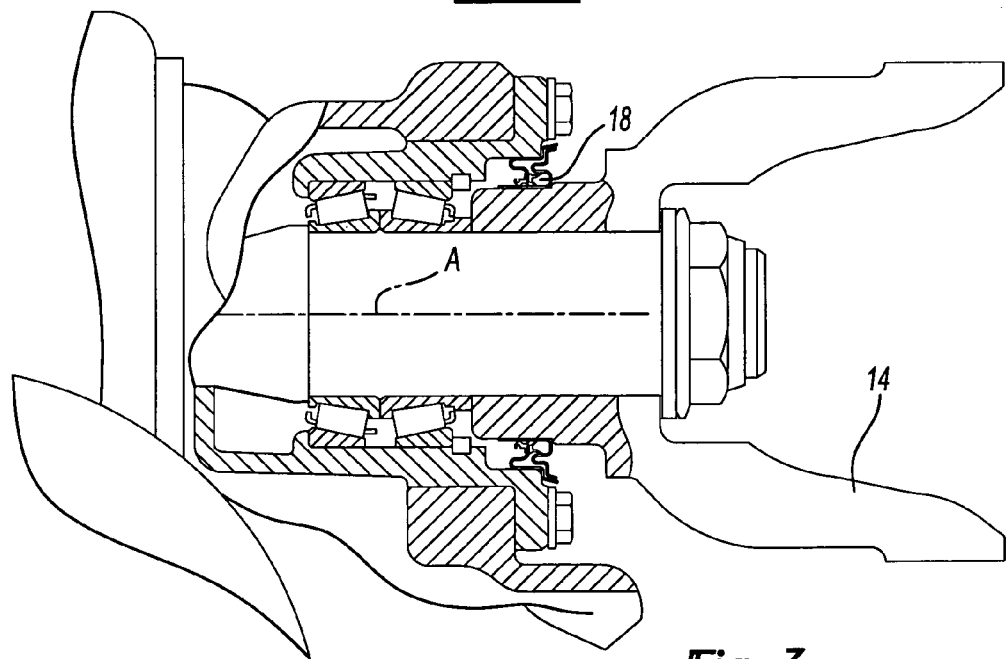
FIG. 3 is an expanded view of a second seal assembly.

The forward drive yoke 12 passes through a forward unitary input seal assembly 16 (also illustrated in FIG. 2). The rearward drive yoke 14 passes through a rearward unitary output seal assembly 18 (also illustrated in FIG. 3). It should be understood that relative positional terms such as "forward," "aft," "upper," "lower," "above," "below," and the like are with reference to the normal operational attitude of the vehicle and should not be considered otherwise limiting.

Figure 4:
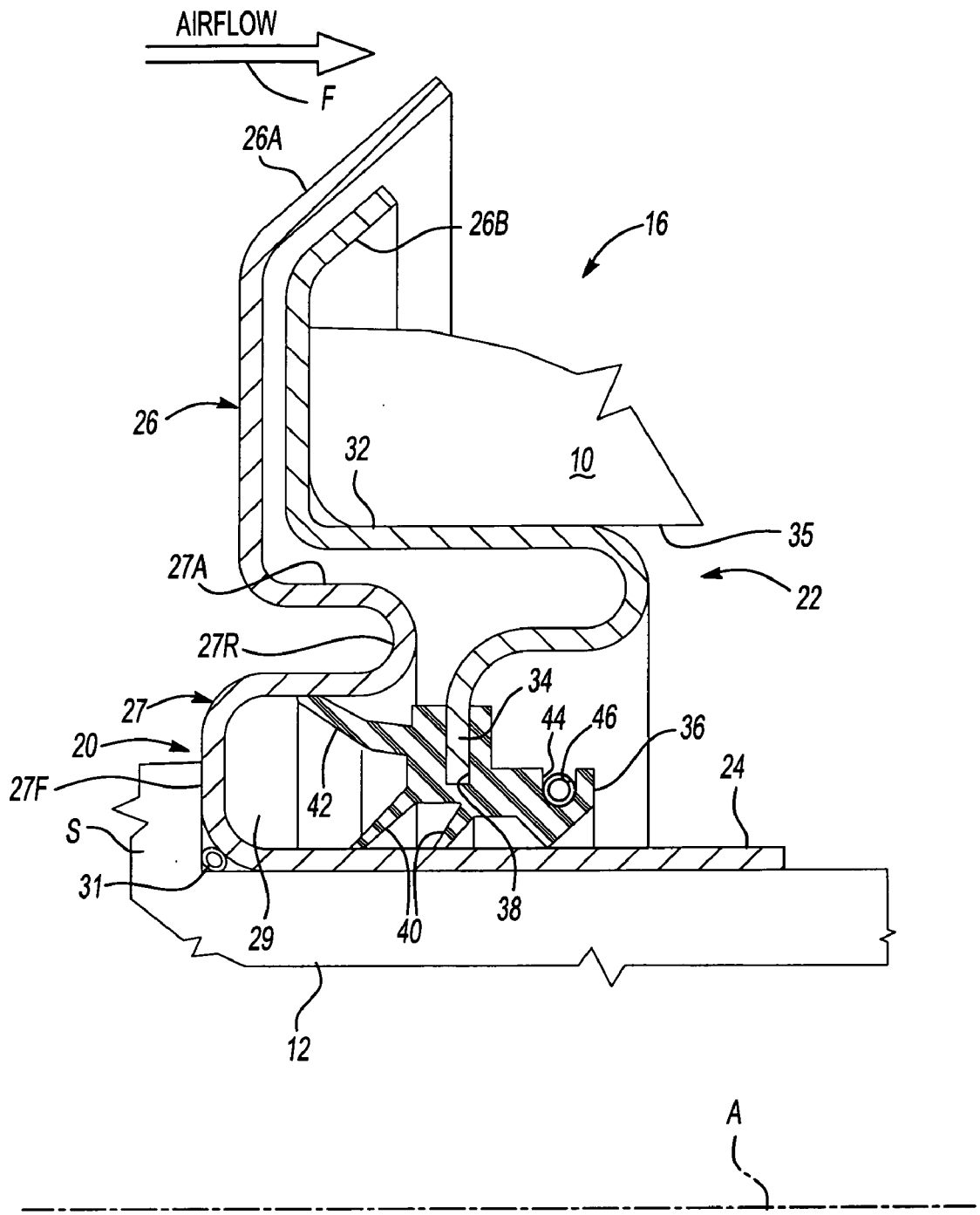
FIG. 4 is an expanded sectional view of the first seal assembly.

Referring to FIG. 4, the seal assembly 16 is illustrated in cross-section. The seal assembly 16 includes a rotating portion 20 which rotates with the yoke 12 and a rotationally fixed portion 22 which is mounted to the housing assembly 10. The portions 20, 22 are preferably stamped sheet metal components.

The rotating portion 20 includes a running sleeve 24, a slinger segment 26 and an upper seal segment 27. The running sleeve 24 and upper seal segment 27 are located generally parallel to the axis A while the slinger segment 26 is arranged perpendicular thereto. The upper seal segment 27 is a U-shaped portion which extends back from the slinger segment 26. The upper seal segment 27 extends parallel to and is spaced away from the running sleeve 24 to form an annular seal cavity 29.

The slinger segment 26 radially extends outward beyond the fixed portion 22 so as to protect the fixed portion 22. A slinger end 26A of the slinger segment 26 is preferably raked in the direction of airflow (illustrated by schematically by arrow F) to further minimize the ingestion of debris into the seal assembly 16. A slinger extension 26B on fixed portion 22 is adjacent slinger end 26A. Slinger extension 26B preferably does not extend radially outward as far as slinger end 26A. Slinger end 26A extends beyond slinger extension 26B for airflow protection. Slinger extension 26B is preferably of a diameter larger than housing assembly 10 to prevent runoff of debris falling into the seal assembly 16. With a larger diameter, the runoff will "roll" circumferentially around the sides and not fall into the seal assembly 16.

The running sleeve 24 includes a resilient seal 31 mounted therein to operate as a static seal. Resilient seal 31 preferably provides for static sealing. Preferably, metal-on-metal contact is provided with only a short interval of resilient materials for static sealing. It should be understood that various seal arrangements in this location can be utilized with the present invention. The rotating portion 20 is preferably assembled with a press fit onto the yoke 12 to contact a yoke shoulder S at surface 27F, however, other assembly procedures can also be utilized with the present invention.

The running sleeve 24 is preferably arranged to contact the yoke 12. Contact between an end of the running sleeve 24 and the yoke 12 provides a metal to metal contact which operates as a thermal transfer path away from a resilient annular seal 36. The fixed portion 22 includes a press fit outer diameter 32 which is pressed into an opening 35 located within the housing assembly 10. The press fit outer diameter 32 is generally parallel to an outer surface 27A of the upper seal segment 27. The outer diameter 32 is generally parallel to the axis A and terminates with a seal mount segment 34 which is generally perpendicular thereto. The press fit outer diameter 32 and the seal mount segment 34 form a generally question mark like shape in cross-section.

The seal mount segment 34 receives the resilient annular seal 36. The resilient annular seal 36 includes a groove 38 within which the seal mount segment 34 engages to locate the resilient annular seal 36 adjacent the seal cavity 29.

The annular seal 36 preferably includes a multiple of wipers 40 which ride upon the running sleeve 24. The wipers 40 form a labyrinth to prevent debris from entering through the seal assembly 16. A reverse wiper 42 extends from the resilient annular seal 36 to engage the upper seal segment 27. The resilient annular seal 36 may additionally include a retainer channel 44 to receive an annular retainer 46 such as an annular spring. It should be understood that a multiple of seal geometries can be utilized with the present invention.

Referring to FIG. 5, the seal assembly 18 is illustrated in cross-section and is of a construction as described above with regard to seal assembly 16. As the seal assembly 18 is rearward facing relative the housing assembly 10 (FIG. 1), a slinger end 26A' of a slinger segment 26' of seal assembly 18 is raked in the direction of airflow (illustrated by schematically by arrow F and opposite that of seal assembly 16 to further minimize the ingestion of debris into the seal assembly 18. Such an integral slinger arrangement provides for a slinger in heretofore unattainable locations as the slinger is internal to the rotating portion of the seal assembly 18.

Slinger end 26A' extends outward of slinger extension 26B'. Preferably slinger end 26A' is angled radially away from centerline A to operate as a drip edge for debris which thereby travel circumferentially around the seal assembly 18 rather than into the seal assembly 18.

The slinger end 26A and the slinger extension 26B both extend generally conically, as is clear from FIGS. 4 and 5. The slinger end 26A and slinger extension 26B extend in a direction having a component both radially outwardly of the axis, and along the axis. Further, as can be seen, one of the slinger end 26A and slinger extension 26B is spaced in the direction of air flow, and that one extends radially outwardly of the other.

The foregoing description is exemplary rather than defined by the limitations within. Many modifications and variations of the present invention are possible in light of the above teachings. The preferred embodiments of this invention have been disclosed, however, one of ordinary skill in the art would recognize that certain modifications would come within the scope of this invention. It is, therefore, to be understood that within the scope of the appended claims, the invention may be practiced otherwise than as specifically described. For that reason the following claims should be studied to determine the true scope and content of this invention.

What is claimed is:

1. An axle assembly comprising:

an axle housing;

an axle to be driven by a drive input including a yoke for receiving a drive force, and rotating a shaft about a drive axis;

a seal assembly mounted between said axle housing and said yoke, said seal assembly including a rotating portion comprising a running sleeve segment located on said shaft and extending along said drive axis, and a fixed portion having a seal mounting segment, with a seal mounted to said seal mounting segment, said seal being in contact with said running sleeve segment, and a slinger end on said rotating portion, said slinger end extending radially outwardly beyond said seal, said slinger end extending in a direction having a component parallel to said drive axis, and a component perpendicular to said drive axis such that said slinger end extends at an angle relative to said drive axis, and said slinger end extending radially outwardly beyond a portion of said axle housing that receives said fixed portion, and a slinger extension on said fixed portion, said slinger extension also extending radially outwardly beyond said seal, said slinger extension also extending in a direction having a component parallel to said drive axis, and a component perpendicular to said drive axis such that said slinger extension extends at an angle relative to said drive axis, and wherein said slinger end is spaced toward said yoke relative to said slinger extension, with said slinger end extending radially outwardly beyond said slinger extension.

2. The axle assembly as set forth in claim 1, wherein a second seal assembly is mounted at a rearward portion of said axle housing, with a second shaft driving a second yoke, and said second seal assembly being mounted between said axle housing and said second yoke, said second seal assembly also including a rotating portion comprising a running sleeve segment located on said second shaft and extending along a drive axis of said second shaft, and a fixed portion having a seal mounting segment, with a seal mounted to said seal mounting segment, said seal being in contact with said running sleeve segment, and a slinger end on fixed portion, said slinger end extending radially outwardly beyond said seal, said slinger end extending in a direction having a component parallel to said drive axis, and a component perpendicular to said drive axis such that said slinger end extends at an angle relative to said drive axis, and said slinger end extending radially outwardly beyond a portion of said axle housing that receives said fixed portion, and a slinger extension on said rotating portion, said slinger extension also extending radially outwardly beyond said seal, said slinger extension also extending in a direction having a component parallel to said drive axis, and a component perpendicular to said drive axis such that said slinger extension extends at an angle relative to said drive axis, and wherein said slinger end of said second seal assembly is spaced away from said second yoke relative to said slinger end, with said slinger end extending radially outwardly beyond said slinger extension.

3. The axle assembly as set forth in claim 1, wherein said rotating portion has a portion curving away from said yoke, and which is radially outwardly of said seal, and in contact with at least a portion of said seal, said portion of said rotating portion then curving back outwardly and merging into said slinger end.

4. A seal assembly comprising:

a rotating portion comprising a running sleeve segment to be located on a shaft and extending along a drive axis, and a fixed portion having a seal mounting segment, with a seal mounted to said seal mourning segment, said seal being in contact with said running sleeve segment, and a slinger end on said rotating portion, said slinger end extending radially outwardly beyond said seal, said slinger end extending in a direction having a component parallel to the drive axis, and a component perpendicular to the drive axis such that said slinger end extends at an angle relative to the drive axis, and said slinger end extending radially outwardly beyond a portion of an axle housing that will receive said fixed portion, and a slinger extension on said fixed portion, said slinger extension also extending radially outwardly beyond said seal, said slinger extension also extending in a direction having a component parallel to the drive axis, and a component perpendicular to the drive axis such that said slinger extension extends at an angle relative to said drive axis, and wherein said slinger end is spaced away from said seal relative to said slinger extension, with said slinger end extending radially outwardly beyond said slinger extension.

5. The seal assembly as set forth in claim 4, wherein said rotating portion has a portion curving towards said seal, and which is radially outwardly of said seal, and in contact with at least a portion of said seal, said portion of said rotating portion then curving back outwardly and merging into said slinger end.

* * * * *

UNITED STATES PATENT AND TRADEMARK OFFICE
CERTIFICATE OF CORRECTION

PATENT NO. : 7,156,400 B2 Page 1 of 1
APPLICATION NO. : 10/721944
DATED : January 2, 2007
INVENTOR(S) : Jack Darrin Oates It is certified that error appears in the above-identified patent and that said Letters Patent is hereby corrected as shown below:

Claim 2, Column 4, line 44: Insert --said-- after "on" and before "fixed"

Signed and Sealed this

Twentieth Day of March, 2007

JON W. DUDAS
*Director of the United States Patent and Trademark Office*